US012322520B2

(12) United States Patent
Long et al.

(10) Patent No.: US 12,322,520 B2
(45) Date of Patent: Jun. 3, 2025

(54) HIGH PERFORMANCE POWER SOURCES INTEGRATING AN ION MEDIA AND RADIATION

(71) Applicant: Stargena, Inc., Austin, TX (US)

(72) Inventors: Roy Long, Cape Coral, FL (US); Junaid Razvi, San Diego, CA (US); Matthew A. Simmons, Morrinsville (NZ)

(73) Assignee: Stargena, Inc., Austin, TX (US)

( * ) Notice: Subject to any disclaimer, the term of this patent is extended or adjusted under 35 U.S.C. 154(b) by 0 days.

(21) Appl. No.: 18/354,765

(22) Filed: Jul. 19, 2023

(65) Prior Publication Data

US 2024/0312660 A1 Sep. 19, 2024

Related U.S. Application Data

(63) Continuation of application No. 17/984,827, filed on Nov. 10, 2022, now Pat. No. 11,749,419.

(60) Provisional application No. 63/278,151, filed on Nov. 11, 2021, provisional application No. 63/293,816, filed on Dec. 26, 2021, provisional application No. 63/293,864, filed on Dec. 27, 2021, provisional application No. 63/406,079, filed on Sep. 13, 2022.

(51) Int. Cl.

*G21H 1/00* (2006.01)
*G21H 1/02* (2006.01)
*G21H 1/04* (2006.01)

(52) U.S. Cl.

CPC ................ *G21H 1/00* (2013.01); *G21H 1/02* (2013.01); *G21H 1/04* (2013.01)

(58) Field of Classification Search

CPC .. G21H 1/00; G21H 1/02; G21H 1/04; G21H 1/06; G21H 1/08
USPC ......................... 310/301, 302, 303, 304, 305
See application file for complete search history.

(56) References Cited

U.S. PATENT DOCUMENTS 2,340,967 A 2/1944 Langer
3,094,634 A 6/1963 Rappaport
(Continued)

OTHER PUBLICATIONS

International Preliminary Report on Patentability in International Appln. No. PCT/US2022/049595, mailed on May 23, 2024, 9 pages.
(Continued)

*Primary Examiner* — Alexander A Singh
(74) *Attorney, Agent, or Firm* — Fish & Richardson P.C.

(57) ABSTRACT

Systems, methods, and devices for electrical power generation are disclosed. A device includes a radioactive source that emits radiation including at least one of: electrically charged particles; electrically neutral particles; or electromagnetic radiation; an ion media positioned adjacent to the radioactive source, wherein the ion media comprises a material that releases electrons in response to exposure to radiation; a set of two or more electrodes configured to: establish an electric field across the ion media; capture electrons released by the ion media in response to exposure to radiation emitted by the radioactive source; and generate electric current from the captured electrons. The device includes a supplemental power supply electrically connected to the set of two or more electrodes. The device includes an electrical load electrically connected to the set of two or more electrodes.

19 Claims, 11 Drawing Sheets

(56) References Cited

U.S. PATENT DOCUMENTS

| | | | | |
|---|---|---|---|---|
| 3,290,522 | A | 12/1966 | Ginell | |
| 3,409,820 | A | 11/1968 | Burke | |
| 3,530,316 | A | 9/1970 | Burke | |
| 4,835,433 | A | 5/1989 | Brown | |
| 5,280,213 | A * | 1/1994 | Day | G21H 1/06 310/305 |
| 5,384,462 | A | 1/1995 | Levitt | |
| 6,191,465 | B1 * | 2/2001 | Freeouf | H01L 31/105 257/458 |
| 6,700,298 | B1 * | 3/2004 | Snyder | G21H 1/00 310/305 |
| 7,196,631 | B1 | 3/2007 | Dziekan et al. | |
| 11,749,419 | B2 | 9/2023 | Long et al. | |
| 2006/0034415 | A1 * | 2/2006 | Tsang | G21H 1/04 376/320 |
| 2012/0038243 | A1 | 2/2012 | Kavetsky et al. | |
| 2012/0146798 | A1 | 6/2012 | Dziekan et al. | |
| 2012/0161575 | A1 | 6/2012 | Choi et al. | |
| 2014/0021826 | A1 * | 1/2014 | Zafiropoulo | B60L 50/90 310/303 |
| 2017/0221595 | A1 | 8/2017 | Frye et al. | |
| 2023/0145416 | A1 | 5/2023 | Long et al. | |

OTHER PUBLICATIONS

[No Author Listed] [online], "How smoke detectors work," video file listed in Wikipedia page "Smoke detector", Mar. 6, 2011, retrieved on Nov. 8, 2022, <https://www.youtube.com/watch?v=oFUUQcpGR3k>, 4 pages [Video Submission].

Blanchard, "Radioisotope Batteries for MEMS," Lecture PDF, University of Wisconsin, Jan. 2005, 31 pages.

Gerritsen, "Ionization by Alpha-Particles in Liquids at Low Temperature," Physica, Aug. 1948, 76 pages.

Kavetsky et al., "Tritium-Charged Capacitor," Nuclear Science and Engineering, Jul. 2008, 159:321-329.

Meyl, "Scalar waves: theory and experiments," Journal of Scientific Exploration, Jun. 2001, 15(2):199-205.

PCT International Search Report and Written Opinion in International Appln. No. PCT/US2022/049595, mailed on Mar. 28, 2023, 17 pages.

Prelas et al., "A Review of Nuclear Batteries," Progress in Nuclear Energy, Aug. 2014, 75:117-148.

Trucchi et al., "Designing CVD Diamond Betavoltaic Batteries," Sensors and Microsystems, 2008, 459-463.

Wikipedia.org [online], "Smoke detector," retrieved on Nov. 8, 2022, retrieved from URL <https://en.wikipedia.org/wiki/Smoke_detector>, 19 pages.

* cited by examiner

HIGH PERFORMANCE POWER SOURCES INTEGRATING AN ION MEDIA AND RADIATION

CROSS-REFERENCE TO RELATED APPLICATION

This application is a continuation of U.S. patent application Ser. No. 17/984,827, filed Nov. 10, 2022 (now allowed), which claims the benefit of U.S. Provisional Application Ser. No. 63/278,151, filed Nov. 11, 2021, U.S. Provisional Application Ser. No. 63/293,816, filed Dec. 26, 2021, U.S. Provisional Application Ser. No. 63/293,864, filed Dec. 27, 2021, and U.S. Provisional Application Ser. No. 63/406,079, filed Sep. 13, 2022, all of which are incorporated herein by reference in their entirety.

TECHNICAL FIELD

This disclosure generally relates to generating electrical power using ionizing radiation from radioactive decay.

BACKGROUND

Some techniques of creating sustainable energy have negative environmental consequences. Energy generation techniques can be massive in scale, not portable, inefficient, and expensive. A hydrocarbon free, sustainable electricity generated from radioactive decay sources is desirable. Radionuclide sources have a very high-power density potential. Radionuclide sources have a smaller environmental impact compared to energy sources such as coal, oil, gas, nuclear fission reactors, nuclear fusion reactors, solar generators, wind generators, burning biomass, or any thermal conversion process that is used to make steam.

SUMMARY

In general, this disclosure relates to high performance power sources integrating an ion media and radiation. The power sources can include systems, apparatus, and devices for generating electrical power. The disclosed technology includes a fuel cell that captures the energy of emitted particles or electromagnetic radiation from any radioactive source, and converts the energy to useful electricity through a process of ionization within an electrostatic field.

In some examples, an ionizing, non-conductive media suspends a radioactive source within an electrostatic field between charged electrodes. The electrodes are formed from an electrically conductive material. The electrodes are connected to a voltage supply, such that the electrodes have opposite polarities. An initial starting circuit energizes the electrodes. The charged electrodes are configured to generate the electrostatic field and to function as collector plates, collecting charge generated from ionization reactions.

Radiation emitted from the radioactive sources ionizes the surrounding ion media, which can be gas, liquid, or solid. The ionization creates ions that are attracted to the electrically polarized collector plates. A current path is created by a load in a connecting electrical circuit with the electrodes. Excess current generated by the ionization is drawn off to, and provides electrical power to, the load in the electrical circuit.

In general, one innovative aspect of the subject matter described in this specification can be embodied in a device including a radioactive source that emits radiation including at least one of: electrically charged particles; electrically neutral particles; or electromagnetic radiation; ion media positioned adjacent to the radioactive source, wherein the ion media comprises a material that releases electrons in response to exposure to radiation; a set of two or more electrodes configured to: establish an electric field across the ion media; capture electrons released by the ion media in response to exposure to radiation emitted by the radioactive source; and generate electric current from the captured electrons.

In general, one innovative aspect of the subject matter described in this specification can be embodied in one or more systems that include an electrical load; a power supply for powering the electrical load, the power supply comprising: a radioactive source that emits radiation including at least one of: electrically charged particles; electrically neutral particles; or electromagnetic radiation; ion media positioned adjacent to the radioactive source, wherein the ion media comprises a material that releases electrons in response to exposure to radiation; a set of two or more electrodes configured to: establish an electric field across the ion media; capture electrons released by the ion media in response to exposure to radiation emitted by the radioactive source; and generate electric current from the captured electrons, wherein the electrical load is powered from the electric current generated by the set of two or more electrodes.

In general, one innovative aspect of the subject matter described in this specification can be embodied in methods that include the actions of establishing, by a set of two or more electrodes, an electric field across ion media positioned adjacent to a radioactive source, wherein: the radioactive source emits radiation including at least one of: electrically charged particles, electrically neutral particles, or electromagnetic radiation; and the ion media comprises a material that releases electrons in response to exposure to radiation; capturing, by the set of two or more electrodes, electrons released by the ion media in response to exposure to radiation emitted by the radioactive source; and generating, by the set of two or more electrodes, the electric current from the captured electrons.

The foregoing and other implementations can each optionally include one or more of the following features, alone or in combination.

In some implementations, the method can include the set of two or more electrodes comprises: a first electrode and a second electrode configured to establish the electric field across the ion media, wherein, when the electric field is established: the first electrode has a positive charge; and the second electrode has a negative charge.

In some implementations, the method can include the first electrode comprises a plate extending in a first plane; and the second electrode comprises a plate extending in a second plane that is parallel to the first plane.

In some implementations, the method can include each electrode of the set of two or more electrodes is formed from an electrically conductive material.

In some implementations, the method can include a supplemental power supply electrically connected to the first electrode and to the second electrode.

In some implementations, the method can include the supplemental power supply comprises a direct current or alternating current power supply.

In some implementations, the method can include an electrical load electrically connected to the first electrode and to the second electrode.

In some implementations, the method can include the electrical load comprises a direct current or alternating current load.

In some implementations, the method can include the radioactive source is located between the first electrode and the second electrode.

In some implementations, the method can include the set of two or more electrodes comprises: a first electrode and a second electrode configured to establish the electric field across the ion media; and a third electrode positioned in the electric field, the third electrode being configured to: capture electrons released by the ion media; and generate the electric current from the captured electrons.

In some implementations, the method can include an electrical load electrically connected to the third electrode.

In some implementations, the method can include the electrical load comprises a direct current or alternating current load.

In some implementations, the method can include the third electrode is positioned between the radioactive source and the first electrode.

In some implementations, the method can include the ion media is positioned between the radioactive source and the third electrode.

In some implementations, the method can include a supplemental power supply electrically connected to the first electrode and to the second electrode.

In some implementations, the method can include supplemental power supply comprises a direct current or alternating current power supply.

In some implementations, the method can include the set of two or more electrodes are electrically connected by a circuit and are configured to: establish the electric field across the ion media using a first electric current provided by a supplemental power supply through the circuit, wherein the electric current generated from the captured electrons comprises current through the circuit in excess of the first electric current.

In some implementations, the method can include the ion media is positioned between the radioactive source and each of the two or more electrodes.

In some implementations, the method can include the ion media comprises a non-conductive material.

In some implementations, the method can include the ion media comprises a material that donates electrons in response to exposure to radiation.

In some implementations, the method can include the ion media includes carbon.

In some implementations, the method can include the ion media includes at least one of low density polyethylene, high density polyethylene, petroleum jelly, butane, heavy oil, helium gas, industrial diamond including carbon, or industrial diamond including boron.

In some implementations, the method can include the ion media includes an electrically non-conductive gas.

In some implementations, the method can include the ion media includes an electrically non-conductive liquid.

In some implementations, the method can include the ion media includes a non-solid material.

In some implementations, the method can include the ion media undergoes ionization from a non-ionized form in response to exposure to radiation in the presence of the electric field.

In some implementations, the method can include the ion media is formed as a plate having a thickness that is: 0.000001 inches or more, and 0.1 inches or less.

In some implementations, the method can include the set of two or more electrodes form a first hollow sphere that encloses the ion media.

In some implementations, the method can include the ion media forms a second hollow sphere that encloses the radioactive source, first hollow sphere being concentric with the second hollow sphere.

In some implementations, the method can include at least one electrode of the set of two or more electrodes forms a first hollow cylinder that encloses the ion media.

In some implementations, the method can include the ion media forms a second hollow cylinder that encloses the radioactive source, the first hollow cylinder being coaxial with the second hollow cylinder.

In some implementations, the method can include the radioactive source includes radioactive isotopes of at least one of Carbon, Strontium, Cesium, Americium, Cobalt, Polonium, Uranium, Radium, or Plutonium.

In some implementations, the method can include the radioactive source is formed as a plate having a thickness that is: 0.000001 inches or more, and 0.1 inches or less.

In some implementations, the radioactive source has a spherical shape.

In some implementations, the radioactive source is surrounded by the ion media.

One innovative aspect is a system including the device. One innovative aspect is a system or device configured to perform operations comprising the method of the previous embodiments and its optional features.

The subject matter described in this specification can be implemented in various implementations and may result in one or more of the following advantages. The disclosed systems can reduce nuclear waste by repurposing nuclear waste for useful production. The disclosed techniques can be used to reduce the need for expensive waste storage management, and the environmental consequences of waste storage.

The disclosed fuel cell is a net negative carbon energy generation solution. The fuel cell uses radioactive decay from nuclear reactor waste by-products to produce a high current output. The fuel cell is modular in form-factor, safe, and stable. The fuel cell can be long-lasting, e.g., generating electricity for years or decades. The disclosed fuel cell can be configured into any topology or architecture that allows for the electrodes to be physically and electrically separated and configured to allow for the creation of an electrostatic field with the source and ion media material in between and within the field.

The fuel cell can be a direct current (DC) or alternating current (AC) power source suitable for terrestrial and space applications. The fuel cell can output a larger current than is input to the fuel cell. The fuel cell can generate electricity at any temperature, with no moving parts, and no excess heat being generated.

The present disclosure further provides a system including the devices provided herein and methods for implementing the devices provided herein. The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF FIGURES

In the drawings, like reference numbers represent corresponding parts throughout.

DETAILED DESCRIPTION

In general, this disclosure relates to an apparatus including a fuel cell that captures and converts the energy of radiation from any radioactive source to electrical energy through the intermediate step of ionization by means of a liquid or solid nonconductive carbon rich media (or electron donating media), in the presence of a charged electrostatic field. Electrical current generated from ionization of the media can be used to power electrical loads. The disclosed fuel cells can be used to power electrical loads and to amplify electrical current.

A starting voltage energizes plates of the fuel cell to create an electrostatic field that captures the energy of the charged ions created in the media by bombardment from the radioactive isotope particles. The capture is done before the ions have the chance to recombine. In some configurations, the electrostatic field may create a scalar environment to capture neutrino radiation, thus enhancing the energy of the free electrons for useful electricity.

Excess current generated by the ions in the electrostatic field is drawn off and utilized by a load connected to the plates in the electrical circuit. Thus, the fuel cell outputs greater electrical current than the electrical current that is supplied to the plates. The fuel cell can also be self-sustaining, as the ionization and collection of ions can continue when the starting voltage is removed.

Figure 1:
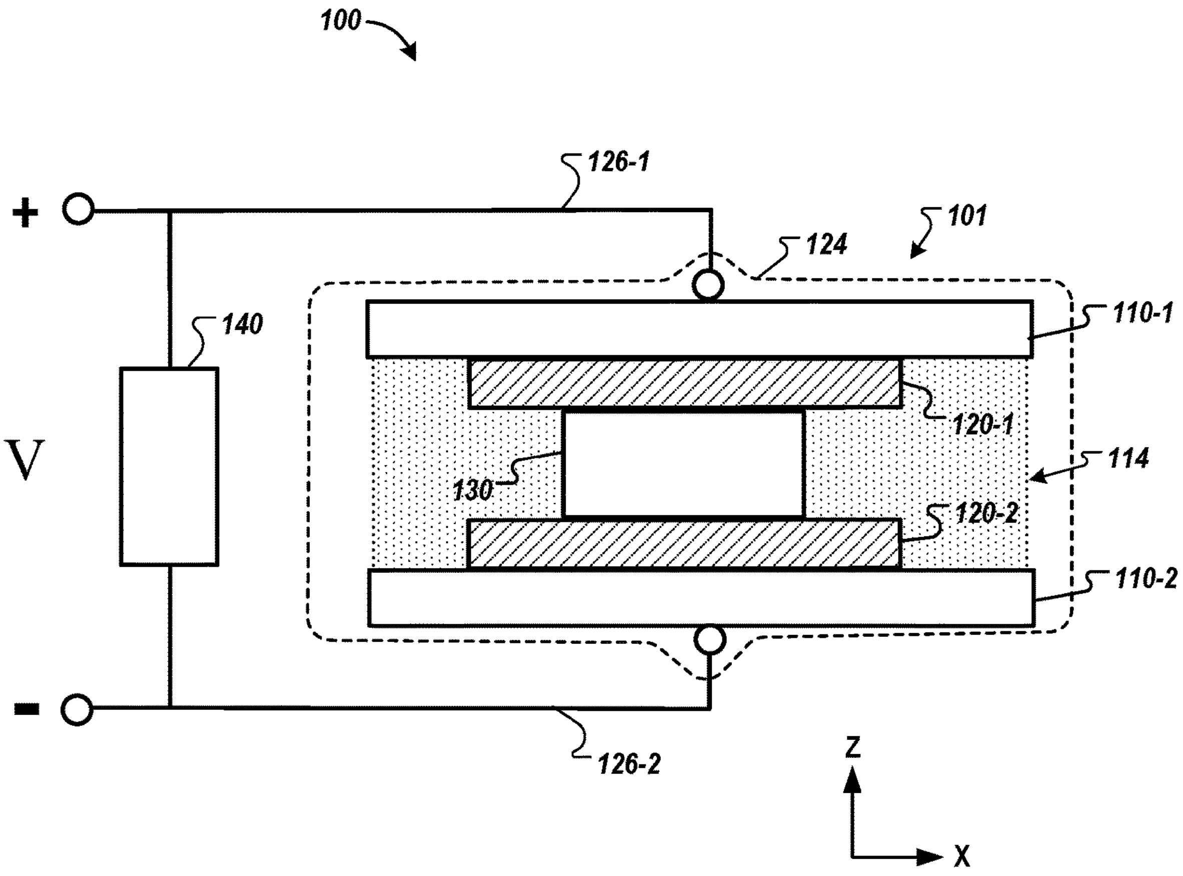
FIG. 1 is an example implementation of a device including a fuel cell.

FIG. 1 is an example implementation of a device 100 including a fuel cell 101. Though the fuel cell 101 has a general plate or disc form, other forms are possible. Some example forms of fuel cells are shown in FIGS. 6 to 8. The device 100 includes a starting circuit including wires 126-1, 126-2 ("wires 126") and supplemental power supply 140. The fuel cell 101 includes electrodes 110-1, 110-2 ("electrodes 110"). The wires 126 connect the electrodes 110 to the supplemental power supply 140.

The fuel cell 101 includes a radioactive source ("source 130"). In some examples, the source 130 is of solid form and has a plate or disc shape. The source 130 can have a thickness (e.g., in the z-direction) of 0.001 inches or less. The source 130 can have a thickness of 0.000001 inches or more. The source 130 can include any radioactive nuclide. In some examples, the source 130 includes a radioactive isotope of at least one of Carbon, Strontium, Cesium, Americium, Cobalt, Polonium, Uranium, Radium, or Plutonium. Isotopes can include, for example, Carbon 14, Strontium 90, Cesium 137, Americium 241, Cobalt 60, Polonium 210. The source 130 can emit, through radioactive decay, electrically charged particles, electrically neutral particles, electromagnetic radiation, or any combination of these. For example, the source 130 can emit any of alpha, beta, gamma, neutron, and neutrino radiation.

The source 130 is positioned between the electrodes 110. In some examples, the source 130 is replaceable. For example, the source 130 depletes over time. When the source 130 is depleted such that the source 130 no longer emits a sufficient amount of radioactive emission, the source 130 can be replaced with a new radioactive source.

The source 130 is positioned adjacent to and between ion media layer 120-1 and ion media layer 120-2 ("ion media layers 120"). In some examples, the source 130 is surrounded by the ion media layers 120. In some examples, the source 130 abuts the ion media layers 120.

The ion media layers 120 include material that releases electrons in response to exposure to radiation. The ion media layers 120 can each include a non-conductive liquid, solid, or gas. The ion media layers 120 are formed from material that donates electrons in response to exposure to radiation. The ion media layers can be formed from carbon-rich material. The ion media layers 120 can include but is not limited to, low density polyethylene (LDPE), high density polyethylene (HDPE), petroleum jelly, butane, heavy oil, helium gas, industrial diamond including carbon, industrial diamond including boron, air, mineral oil, or any combination of these. In some examples, each of the ion media layers 120 includes ion media film. In some examples, each of the ion media layers is formed as a plate. The ion media layers 120 can each have a thickness of 0.000001 inches or more. The ion media layers 120 can each have a thickness of 0.1 inches or less (e.g., 0.03 inches or less, 0.003 inches or less).

The source 130 and the ion media layers 120 are positioned between the electrode 110-1 and the electrode 110-2. The electrodes are energized to establish the electric field 114. In some examples, the fuel cell includes a set of two or more electrodes 110. The electrodes 110 function as collector plates to collect electrons freed from the ion media layers 120 due to ionizing radiation. In some examples, when energized, the electrode 110-1 has an opposite polarity from the electrode 110-2.

In some examples, each electrode can be a plate extending in a plane. The electrode 110-1 can extend in a plane that is parallel or approximately parallel to the plane in which the electrode 110-2 extends. The electrodes 110 each have a surface area in the x-y plane. In some examples, the surface area of each electrode is greater than a surface area of the source 130 in the x-y plane.

The electrodes 110 can be formed from any electrically conductive material, e.g., a metallic material. The electrodes 110 can be formed from, for example, copper, aluminum, silver, gold, mild steel, or any combination of these. In some examples, the electrodes 110 can each be formed as a disc or plate. The electrodes 110 are connected by the wires 126 to a supplemental power supply 140.

The supplemental power supply 140 can be, for example, an AC or DC voltage supply. In some examples, the supplemental power supply 140 is a battery. In some examples, the supplemental power supply 140 is integrated into the same device as the fuel cell 101. In some examples, the supplemental power supply 140 is an external power supply.

The fuel cell 101 is bound together to reduce space between the source 130 and the electrodes 110. In some examples, the electrodes 110, ion media layers 120, and source 130 are bolted together with plastic or metal bolts. In some examples, the fuel cell 101 is bound together with a strongback, wrap, or casing. In some examples, the fuel cell 101 includes shielding 124 around the source 130, ion media layers 120, and electrodes 110. In some examples, the shielding 124 is formed from a ceramic material.

During operation, the supplemental power supply 140 provides a starting current to the electrodes 110 through the wires 126. The starting current facilitates initial charging of the electrodes 110. The starting current can also sustain the charge of the electrodes 110 during operation. When the starting current is provided to the electrodes 110, the electrodes 110 establish the electric field 114 across the ion media layers 120. When the supplemental power supply 140 is a DC power supply, the electrodes have opposite charges when energized. For example, the electrode 110-1 can have a positive charge, and the electrode 110-2 can have a negative charge.

In some examples, the supplemental power supply 140 includes a feedback loop and voltage regulation. For example, if the charge of the electrodes 110 or the strength of the electric field drops below a minimum threshold, the supplemental power supply 140 can provide current to replenish the charge. In this way, the supplemental power supply 140 can maintain the voltage across the electrodes 110 over time. In some examples, the supplemental power supply 140 is rechargeable by the fuel cell 101.

In the presence of the electric field 114, the ion media layers 120 undergo ionization from a non-ionized form in response to exposure to radiation from the source 130. The ionizing radiation emitted by the source 130 can include radioactive particles or electromagnetic radiation. Ionizing radiation includes subatomic particles and electromagnetic waves that have sufficient energy to ionize atoms or molecules by detaching electrons from them. Gamma rays, X-rays, and the higher energy part of the electromagnetic spectrum are ionizing radiation. Ionizing subatomic particles include alpha particles, beta particles, neutrinos, and neutrons.

Particles and/or radiation emitted by the source 130 interact with electron clouds of carbon atoms of the ion media layers 120 through Coulomb interactions. The particles remove energetic electrons from their bound state. Those electrons eject out other electrons in secondary and tertiary reactions, enhancing ionization. Radioactive particles can affect the Coulomb field of electron clouds and neutrino radiation can interact in a scalar field. The interactions enhance the current/energy of the ionized electrons. Thus, a multitude of freed electrons are produced in the ion media layers 120 in response to exposure to ionizing radiation emitted by the source 130.

Electrons released from atoms of the ion media layers 120 are attracted to the charged electrodes 110. Ion recombination is reduced due to the presence of the electric field and the attraction between the electrons and the electrodes 110. In the example in which the electric field 114 is a DC electric field, the electrons are attracted to the positive electrode, e.g., electrode 110-1. Electrons move through the ion media layers 120 and are collected by the electrodes 110. Current generated from the collected electrons flows from the electrodes 110 to the wires 126. The current flowing through the wires therefore includes the starting current and the excess current from the electrons freed from the ion media layer 120. In this way, the fuel cell 101 amplifies the starting current. The excess current can be used to power a load, as described in greater detail with respect to FIGS. 2A, 2B, and 2C.

Figure 2A:
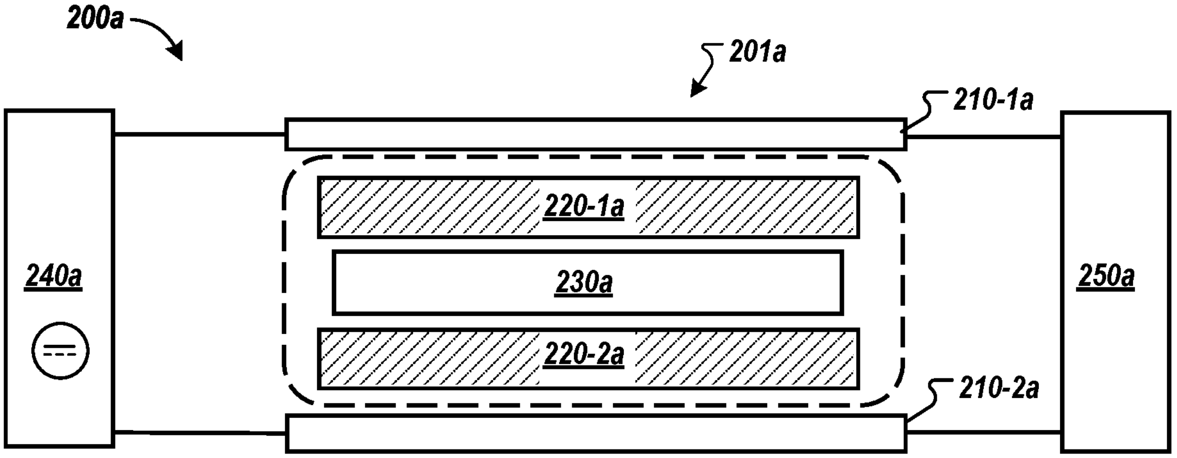
FIGS. 2A, 2B, and 2C show example implementations of devices including fuel cells and electrical loads.
Figure 2B:
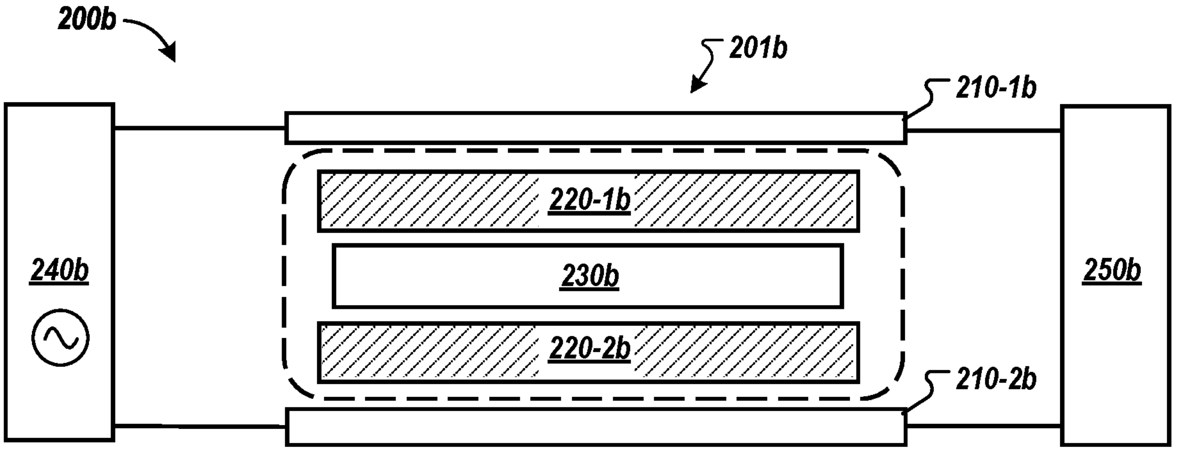
Figure 2C:
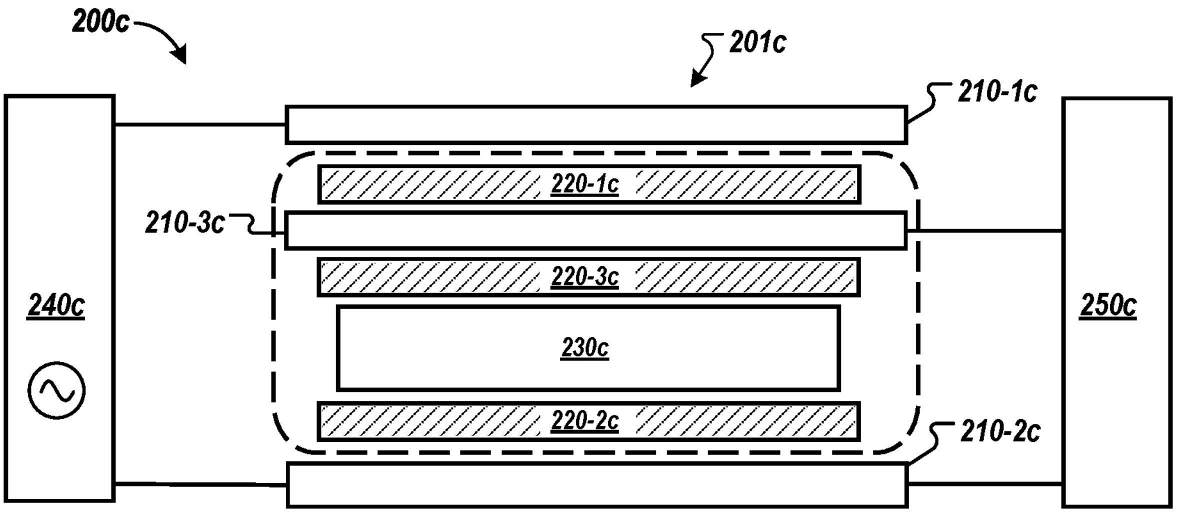

FIGS. 2A, 2B, and 2C show example implementations of devices 200*a*, 200*b*, 200*c* ("devices 200"). The devices 200*a*, 200*b*, 200*c* including fuel cells 201*a*, 201*b*, 201*c* ("fuel cells 201"), electrical loads 250*a*, 250*b*, 250*c* ("loads 250"), and supplemental power supplies 240*a*, 240*b*, 240*c* ("power supplies 240"), respectively.

The devices 200 each include an electrical current path between the respective power supply 240, fuel cell 201, and load 250. Electrodes of the devices 200 collect current from the charged ions and add the current to the circuit leading to the load 250. In this way, excess current generated by the fuel cell 201 can be drawn off to power any load by any connecting electrical circuit.

FIG. 2A shows the device 200*a* including a power supply 240*a*, a fuel cell 201*a*, and a load 250*a*. The power supply 240*a* is a DC power supply and the load 250*a* is a DC load. The power supply 240*a* and the load 250*a* are electrically connected to the fuel cell 201*a* to form a circuit. Specifically, wires connect the electrode 210-1*a* to the power supply 240*a* and to the load 250*a*. Wires connect the electrode 210-2*a* to the power supply 240*a* and to the load 250*a*.

The fuel cell 201*a* includes ion media layers 220-1*a*, 220-2*a*. The ion media layer 220-1*a* is positioned between a source 230*a* and electrode 210-1*a*. The ion media layer 220-2*a* is positioned between the source 230*a* and electrode 210-2*a*. Operations of the device 200*a* are described with reference to FIG. 3A.

FIG. 2B shows the device 200*b* including a power supply 240*b*, a fuel cell 201*b*, and a load 250*b*. The power supply 240*b* is an AC power supply and the load 250*b* is an AC load. The power supply 240*b* and the load 250*b* are electrically connected to the fuel cell 201*b* to form a circuit. Specifically, wires connect the electrode 210-1*b* to the power supply 240*b* and to the load 250*b*. Wires connect the electrode 210-2*b* to the power supply 240*b* and to the load 250*b*.

The fuel cell 201*b* includes ion media layers 220-1*b*, 220-2*b*. The ion media layer 220-1*b* is positioned between a source 230*b* and electrode 210-1*b*. The ion media layer 220-2*b* is positioned between the source 230*b* and electrode 210-2*b*. Operations of the device 200*b* are described with reference to FIG. 3B.

FIG. 2C shows the device 200*c* including a power supply 240*c*, a fuel cell 201*c*, and a load 250*c*. The power supply 240*c* is an AC power supply and the load 250*c* is an AC load. The power supply 240*c* and the load 250*c* are electrically connected to the fuel cell 201*c* to form a circuit. Specifically, wires connect the electrode 210-1*c* to the power supply 240*c*. Wires connect the electrode 210-3*c* to the load 250*c*. Wires connect the electrode 210-2*c* to the power supply 240*c* and to the load 250*c*.

The fuel cell 201*c* includes ion media layers 220-1*c*, 220-2*c*, 220-3*c*. The ion media layer 220-1*c* is positioned between electrode 210-1*c* and 210-3*c*. The ion media layer 220-2*c* is positioned between source 230*c* and electrode 210-2*c*. The ion media layer 220-3*c* is positioned between the source 230*c* and electrode 210-3*c*. The electrode 210-3*c* is a "floating" electrode, that is suspended between ion media layer 220-1*c* and ion media layer 220-3*c*. Although shown in FIG. 3C as being an AC power supply, in some implementations, the power supply 240*c* can be a DC power supply. Operations of the device 200*c* are described with reference to FIG. 3C.

Figure 3A:
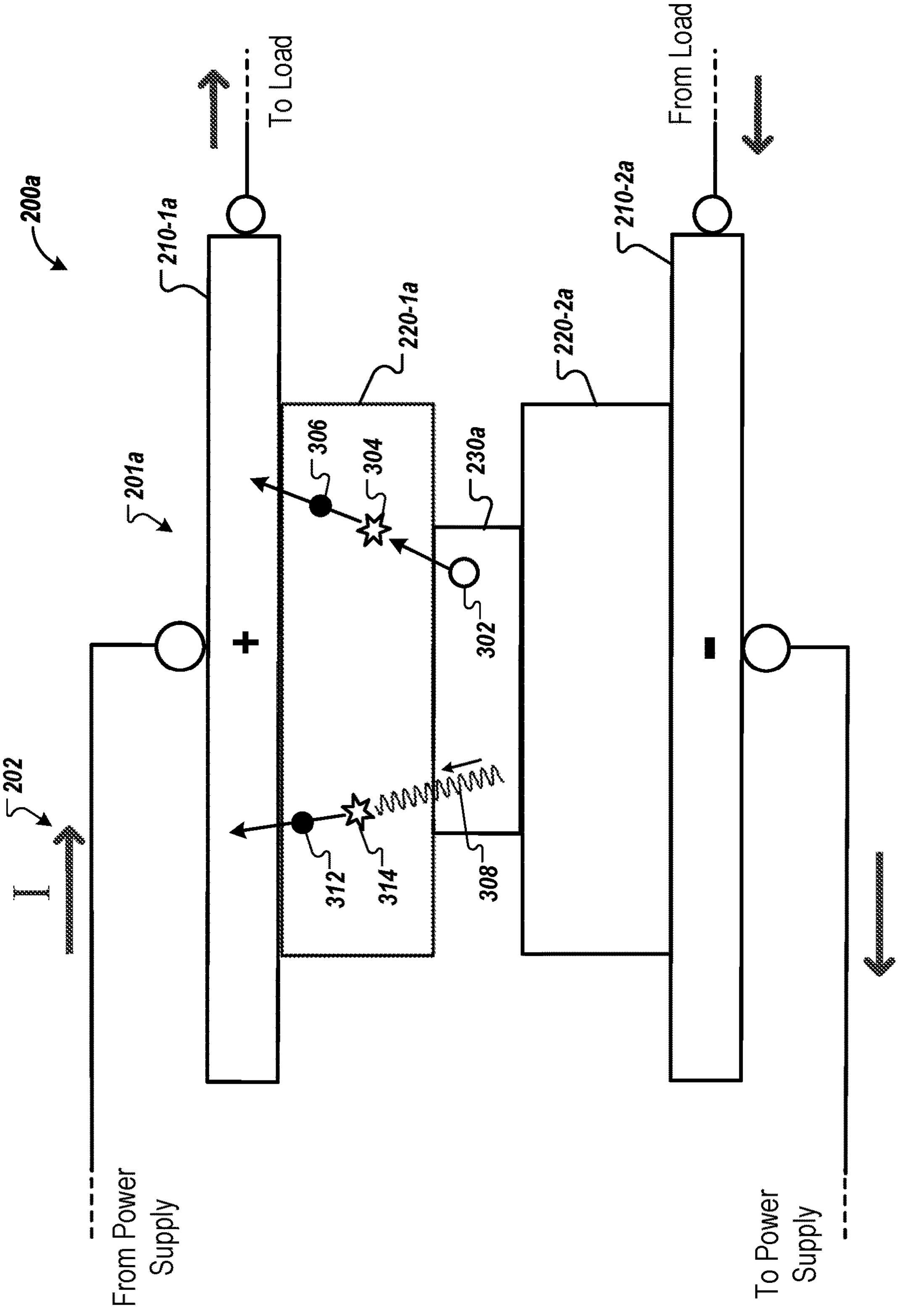
FIGS. 3A, 3B, and 3C show ionization and current flow within the devices of FIGS. 2A, 2B, and 2C.
Figure 3B:
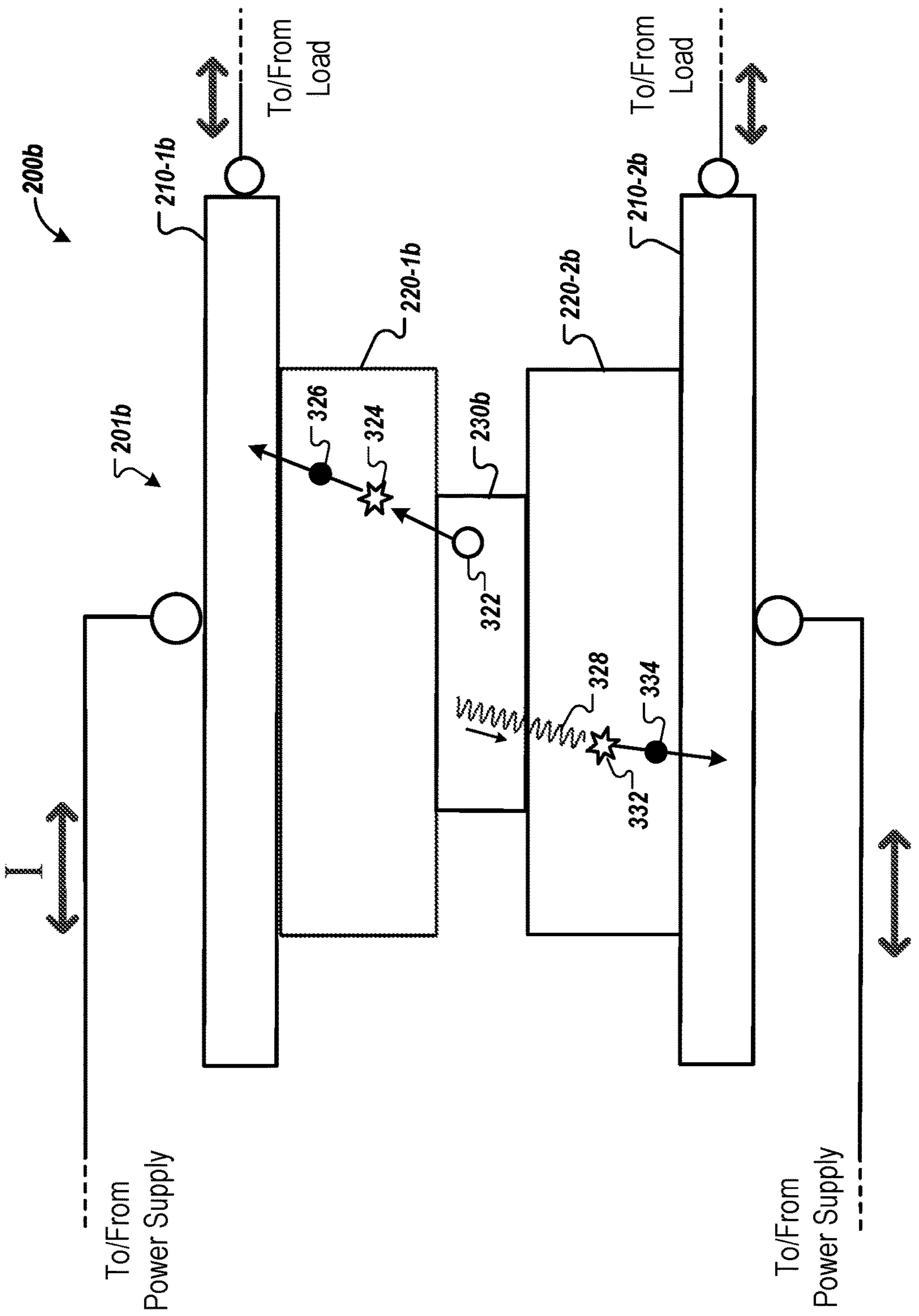
Figure 3C:
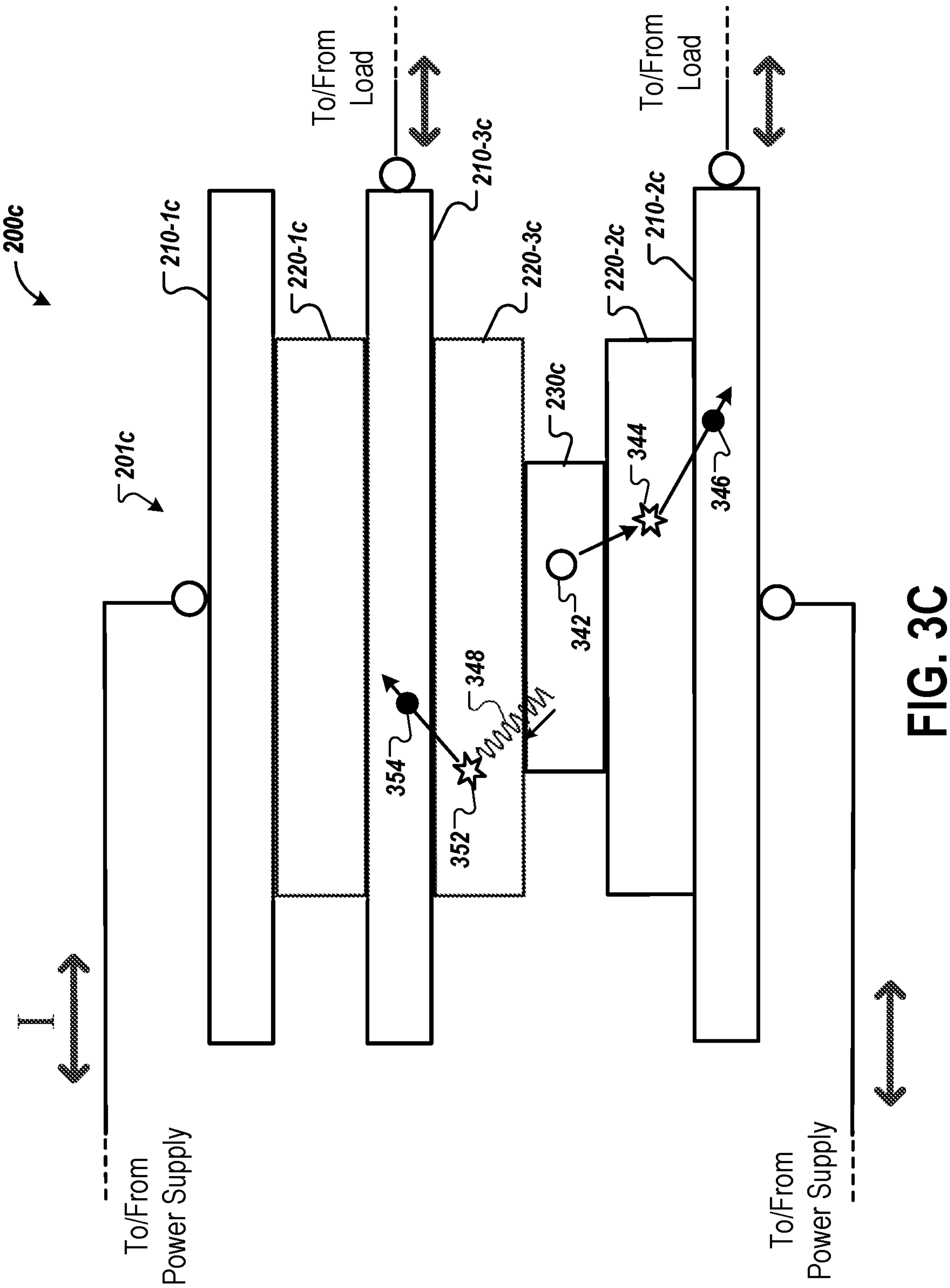

FIGS. 3A to 3C show ionization and current flow within the devices of FIGS. 2A, 2B, and 2C. Referring to FIG. 3A, electrodes 210-1*a* and 210-2*a* create an electric field across the ion media layers 220 and across the source 230*a* when a starting current is provided by the DC power supply 240*a*. When energized by the power supply 240*a*, electrode 210-1*a* has a positive charge, and electrode 210-1*b* has a negative charge. Arrows 202 indicate the direction of current flow in the circuit of the device 200*a*.

The source 230*a* emits radiation in the form of radioactive particles, electromagnetic radiation, or both. In the example of FIG. 3A, the source 230*a* emits a particle 302 (e.g., a neutron, alpha, beta, or neutrino particle). The source 230*a* also emits an electromagnetic wave 308 (e.g., a gamma ray, X-ray, or UV ray). The particle 302 and the wave 308 travel through the ion media layer 220-1*a* and create ions from the electron clouds of atoms in the ion media. The particle 302 undergoes an ionization reaction 304, freeing electron 306. The wave 308 undergoes an ionization reaction 314, freeing electron 312. The electrons 306, 312 are attracted to the positively charged electrode 210-1*a*. Electrons captured by the charged electrode 210-1*a* amplify the current flowing through the circuit of the device 200*a*.

Referring to FIG. 3B, electrodes 210-1*b* and 210-2*b* create an electric field across the ion media layers 220 and across the source 230*b* when a starting current is provided by the AC power supply 240*b*. When energized by the AC power supply 240*b*, the electrodes 210-1*b*, 210-2*b* each alternate between having a positive charge and having a negative charge. Thus, the direction of the electric field alternates over time.

The source 230*b* emits radiation in the form of radioactive particles, electromagnetic radiation, or both. In the example of FIG. 3B, the source 230*b* emits a particle 322 and an electromagnetic wave 328. The particle 322 and the wave 328 travel through the ion media layers 220-1*b*, 220-2*b*, respectively, and create ions from the electron clouds of atoms in the ion media. The particle 322 undergoes an ionization reaction 324, freeing electron 326. The wave 328 undergoes an ionization reaction 332, freeing electron 334. The electrons 326, 334 can be attracted to the either of the electrodes 210-1*b*, 210-2*b*, since the charges of the electrodes 210-1*b*, 210-2*b* alternate over time. Electrons captured by the charged electrodes 210-1*b*, 210-2*b* amplify the current flowing through the circuit of the device 200*a*.

Referring to FIG. 3C, electrodes 210-1*c* and 210-2*c* create an electric field across the ion media layers 220 and across the source 230*c* when a starting current is provided by the AC power supply 240*c*. When energized by the AC power supply 240*c*, the electrodes 210-1*c*, 210-2*c* each alternate between having a positive charge and having a negative charge. Thus, the direction of the electric field alternates over time.

The source 230*c* emits radiation in the form of radioactive particles, electromagnetic radiation, or both. In the example of FIG. 3C, the source 230*c* emits a particle 342 and an electromagnetic wave 348. The particle 342 and the wave 328 travel through the ion media layers 220-1*c*, 220-2*c*, respectively, and create ions from the electron clouds of atoms in the ion media. The particle 342 undergoes an ionization reaction 344, freeing electron 346. The wave 348 undergoes an ionization reaction 352, freeing electron 354. The electrons 346, 354 can be attracted to the either of the electrodes 210-1*c*, 210-2*c*, since the charges of the electrodes 210-1*c*, 210-2*c* alternate over time.

The electrode 210-3*c* is positioned between the source 230*c* and the electrode 210-1*c*. Thus, some electrons traveling towards the electrode 210-1*c* can be captured by the electrode 210-3*c*. The load 250*c* is electrically connected to the electrode 210-3*c*. Electrons that are captured by the electrode 210-3*c*, e.g., electron 354, amplify current flow between the electrode 210-3*c* and the load 250*c*. Similarly, electrons captured by the charged electrodes 210-1*c*, 210-2*c* amplify the current flowing through the circuit of the device 200*a*.

Figure 4:
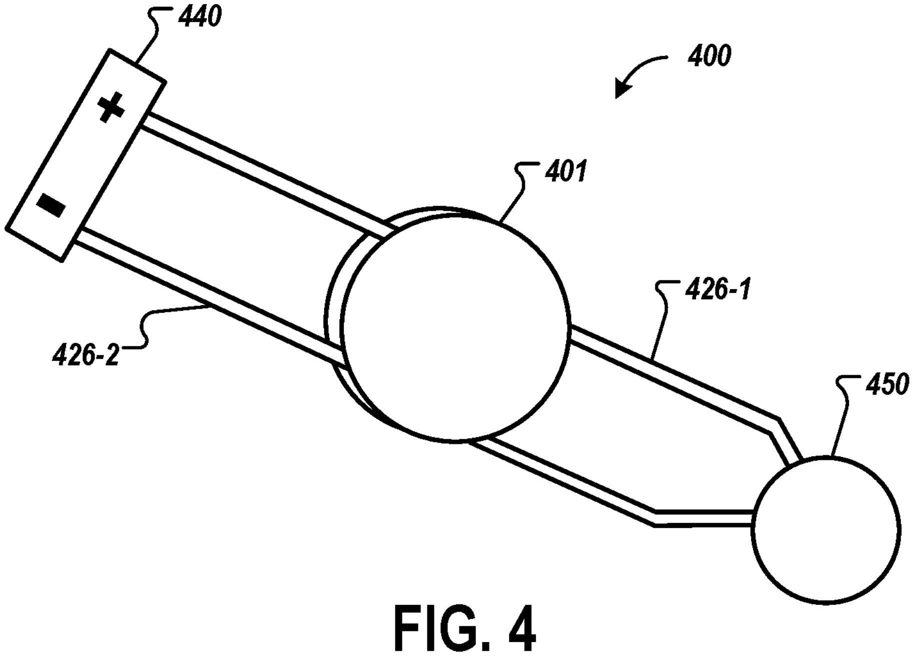
FIG. 4 shows an example device including a fuel cell in line with a supplemental power supply and an electrical load.

FIG. 4 shows an example device 400 including a fuel cell 401 in line with a supplemental power supply 440 and a load 450. A first wire 426-1 connects the power supply 440 to a first electrode of the fuel cell 401 and to the load 450. A second wire 426-2 connects the power supply 440 to a second electrode of the fuel cell 401 and to the load 450.

Figure 5:
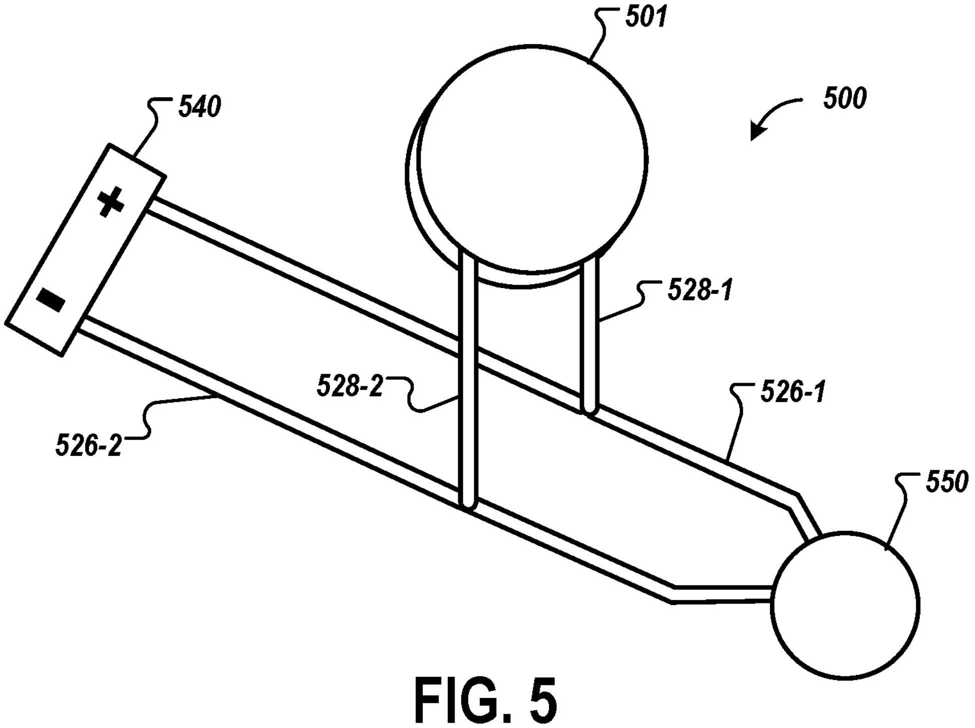
FIG. 5 shows an example device including a fuel cell out of line with a supplemental power supply and an electrical load.

FIG. 5 shows an example device 500 including fuel cell 501 out of line with a supplemental power supply 540 and an electric load 550. A first wire 526-1 and a second wire 526-2 connect the power supply 540 to the load 550. A third wire 528-1 connects the first wire 526-1 to a first electrode of the fuel cell 501. A fourth wire 528-2 connects the second wire 526-2 to a second electrode of the fuel cell 501.

Compared to the device 500, the device 400 has a more compact form, with a fewer number of wires and connections. Compared to the device 400, the device 500 is more modular and reconfigurable. The configuration of the device 500 can implemented to permit the fuel cell 501 to be remote from the power supply 540, the load 550, or both. The configuration of the device 500 can be implemented to permit the fuel cell to be removable and/or replaceable from the device 500.

Figure 6A:
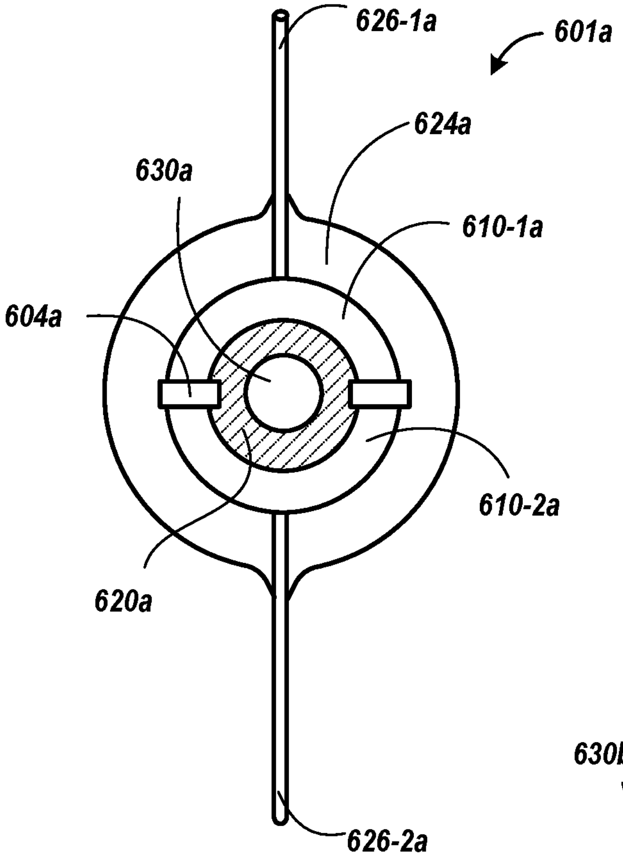
FIGS. 6A and 6B show an example fuel cell having a spherical form.
Figure 6B:
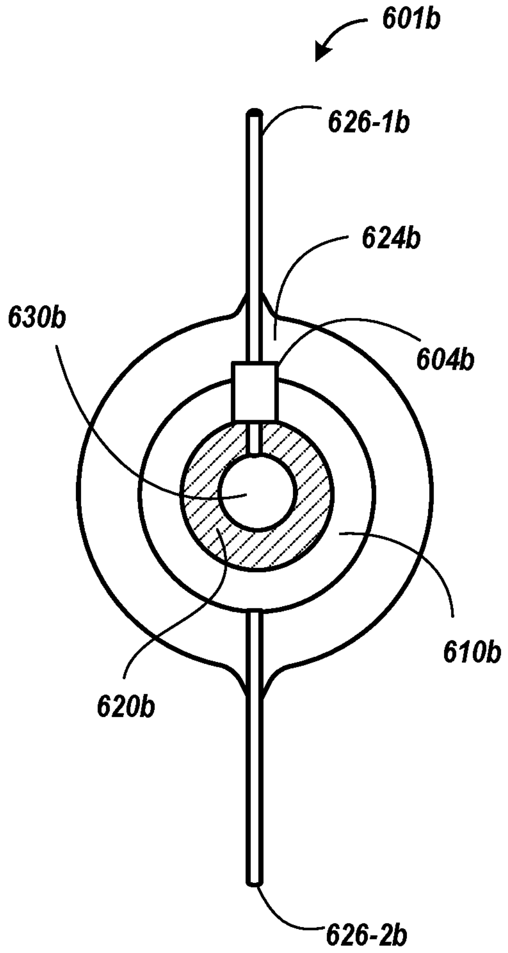

FIGS. 6A and 6B show example fuel cells having a spherical form. FIG. 6A shows an example fuel cell 601*a* having a spherical form and two electrodes 610-1*a*, 610-2*a*. FIG. 6B shows an example fuel cell 601*b* having a spherical form and one electrode 610*b*. A fuel cell having a spherical form can improve efficiency of capturing radioactive emissions, compared to a fuel cell having a plate or disc form. For example, a fuel cell having a spherical form can include a radioactive source that is enclosed within an ion media layer, such that all radioactivity emitted by the source passes through the ion media layer.

Referring to FIG. 6A, the fuel cell 601*a* includes a radioactive source 630*a*. In some examples, the source 630*a* has a spherical shape. The fuel cell 601*a* includes an ion media layer 620*a*. In some examples, the ion media layer 620*a* forms a hollow sphere that encloses, or wraps around, the source 630*a*.

The fuel cell 601*a* includes electrodes 610-1*a*, 610-2*a*. A first wire 626-1*a* connects to the electrode 610-1*a*. A second wire 626-2*a* connects to the electrode 610-2*a*. Each of the two electrodes 610-1*a*, 610-2*a* form a hemispherical shape or approximate hemispherical shape. An insulator 604*a* is positioned between the electrodes 610-1*a*, 610-2*a*. The insulator 604*a* electrically insulates the electrodes 610-1*a*, 610-2*a* from each other In some examples, the insulator 604*a* has a ring shape. In some examples, the insulator 604*a* is formed from a paper material. In some examples, the electrodes 610-1*a*, 610-2*a* and the insulator 604*a* form a hollow sphere that encloses, or wraps around, the ion media layer 620*a*. In some examples, the hollow sphere formed by the electrodes is concentric with the hollow sphere formed by the ion media layer 620*a*.

Operations of the fuel cell 601*a* are similar to operations of the fuel cell 101. Due to the spherical form, the fuel cell 601*a* includes one ion media layer 620*a* instead of two ion media layers. Radiation emitted by the source 630*a* undergoes ionization reactions in the ion media layer 620*a*.

Electrons freed from the ion media layer 620*a* are captured by the electrodes 610-1*a*, 610-2*a*, amplifying current flowing through the wires 626-1*a*, 626-2*a*.

The fuel cell 601*a* can include a shielding 624*a*. The shielding can wrap around the electrodes 610-1*a*, 610-2*a*. The shielding 624*a* can be formed from a non-conductive material such as ceramic. The shielding can reduce the amount of radiation escaping from the fuel cell, and can provide structural integrity to the fuel cell 601*a*. The shielding 624*a* can include apertures to permit passage of the wires 626-1*a*, 626-2*a* through the shielding 624*a* to reach the electrodes 610-1*a*, 610-2*a*.

Referring to FIG. 6B, the fuel cell 601*b* includes a radioactive source 630*b*. In some examples, the source 630*b* has a spherical shape. The fuel cell 601*b* includes an ion media layer 620*b*. In some examples, the ion media layer 620*b* forms a hollow sphere that encloses, or wraps around, the source 630*b*. A first wire 626-1*b* connects to the source 630*b*. The source 630*b* can be, for example, a metal oxide.

The fuel cell 601*b* includes electrode 610*b*. A second wire 626-2*b* connects to the electrode 610*b*. The electrode 610*b* forms a spherical shape or approximate spherical shape. The electrode 610*b* includes an aperture through which the wire 626-1*b* passes. An insulator 604*b* is positioned in the aperture, between the wire 626-1*b* and the electrode 610*b*. The insulator 604*b* electrically insulates the electrode 610*b* from the wire 626-1*b* that connects to the source 630*b*. The electrode 610*b* and the insulator 604*b* form a hollow sphere that encloses, or wraps around, the ion media layer 620*b*. In some examples, the hollow sphere formed by the electrode 610*b* is concentric with the hollow sphere formed by the ion media layer 620*b*.

In general, operations of the fuel cell 601*b* are similar to operations of the fuel cell 101. The fuel cell 601*b* includes one electrode instead of two electrodes. The source 630*b*, connected to the wire 626-1*b*, functions as a second electrode. Electrical current from the wire 626-1*b* charges the source 630*b*, while the electrode 610*b* is charged by the wire 626-2*b*. Thus, the electrode 610*b* and the source 630*b* establish an electric field across the ion media layer 620*b*.

Due to the spherical form, the fuel cell 601*b* includes one ion media layer 620*b* instead of two ion media layers. Radiation emitted by the source 630*b* undergoes ionization reactions in the ion media layer 620*b*. Electrons freed from the ion media layer 620*b* are captured by the electrode 610*b*, or by the source 630*b*, amplifying current flowing through the wires 626-1*b*, 626-2*b*.

The fuel cell 601*b* can include a shielding 624*b*. The shielding can wrap around the electrode 610*b*. The shielding 624*b* can be formed from a non-conductive material such as ceramic. The shielding can reduce the amount of radiation escaping from the fuel cell, and can provide structural integrity to the fuel cell 601*b*. The shielding 624*b* can include apertures to permit passage of the wires 626-1*b*, 626-2*b* through the shielding 624*b* to reach the source 630*b* and the electrode 610*b*, respectively.

Figure 7A:
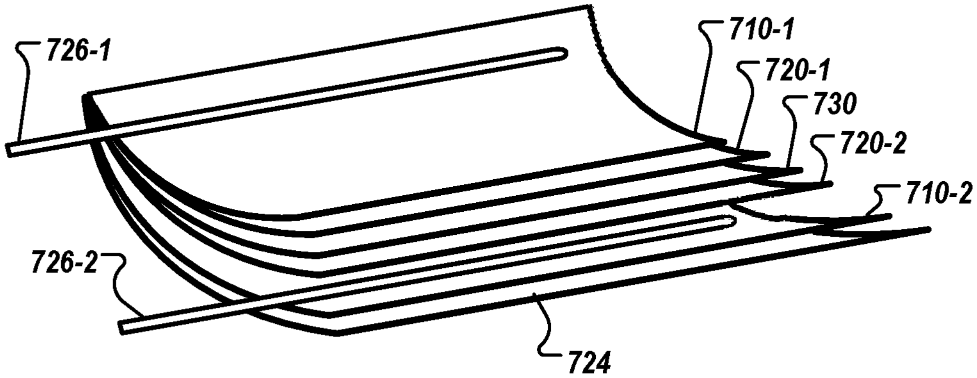
FIGS. 7A, 7B, and 7C show an example fuel cell having a cylindrical form.
Figure 7B:
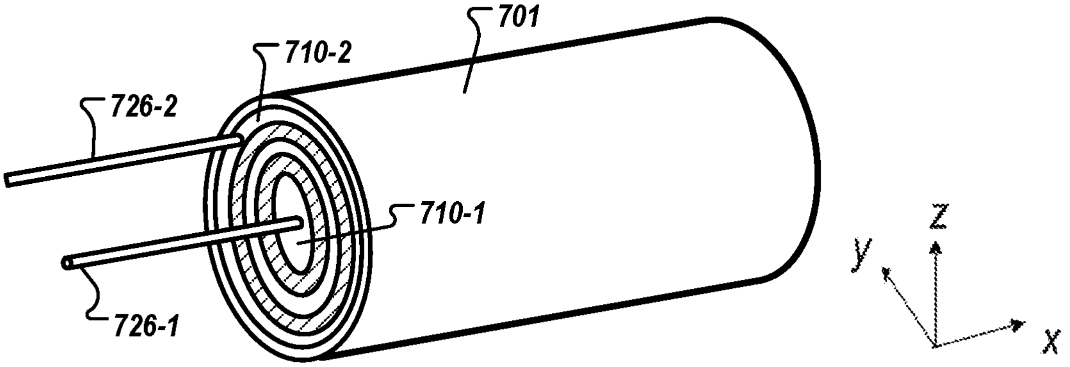
Figure 7C:
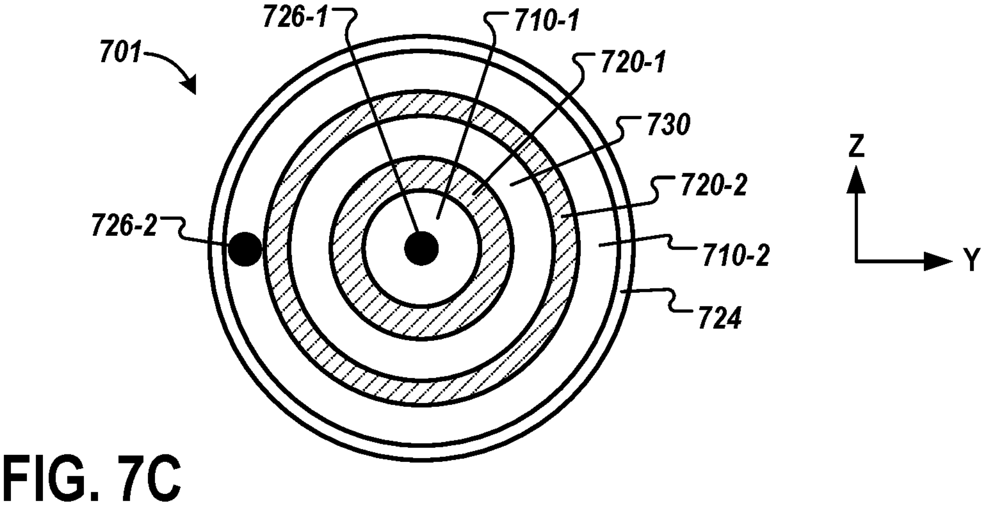

FIGS. 7A to 7C show an example fuel cell 701 having a cylindrical form. FIG. 7A illustrates assembly of the example fuel cell 701. FIG. 7B shows a perspective view of the example fuel cell 701. FIG. 7C shows a cross-sectional view of the example fuel cell 701.

Referring to FIG. 7A, a fuel cell can be assembled by rolling layers of thin, flat foils and papers around wires. The layers include electrode foil 710-1, ion media foil 720-1, source foil 730, ion media foil 720-2, electrode foil 710-2, and insulation paper wrapping 724. When wrapped, each layer forms a hollow cylinder shape. The hollow cylinders formed by the layers are coaxial with each other.

In some examples, the source foil 730 includes source material that is electronically printed on a silver or gold foil. In some examples, instead of or in addition to the fuel cell 701 having a separate source foil 730, the ion media foil 720 could be embedded with flecks of source material.

In some examples, the fuel cell 701 can be assembled with wires 726-1, 726-2 rolled into the cylindrical form. For example, the electrode foil 710-1 can be wrapped around a first wire 726-1 such that the electrode foil 710-1 is in electrical communication with the wire 726-1. A second wire 726-2 can be positioned between the ion media foil 720-2 and the electrode foil 710-2, or between the electrode foil 710-2 and the insulation paper wrapping 724, such that the electrode foil 710-2 is in electrical communication with the wire 726-2.

In some examples, the wires 726-1, 726-2 can be connected to the electrode foils 710-1, 710-2, after the cylindrical form of the fuel cell 701 is assembled. For example, referring to FIG. 7B, the wires 726-1, 726-2 can be connected to edges of the electrode foils 710-1, 710-2 at one or both ends of the cylindrical fuel cell 701.

Referring to FIG. 7C, the electrode foils 710-1, 710-2 each form a hollow cylinder. The ion media foils 720-1, 720-2 each form a hollow cylinder. The electrode foil 710-2 encloses the ion media foil 720-2. The ion media foil 720-1 encloses the electrode foil 710-1.

In some examples, the fuel cell 701 can be placed in a cylindrical can, with the wires 726-1, 726-2 sticking out of an open end of the can. An insulated end cap can be placed over the open end, with the wires 726-1, 726-2 threaded through separate small holes. Shielding can be placed around the can to reduce radiation. In some examples, the can, the shielding, or both, can be formed form a ceramic material.

Figure 8A:
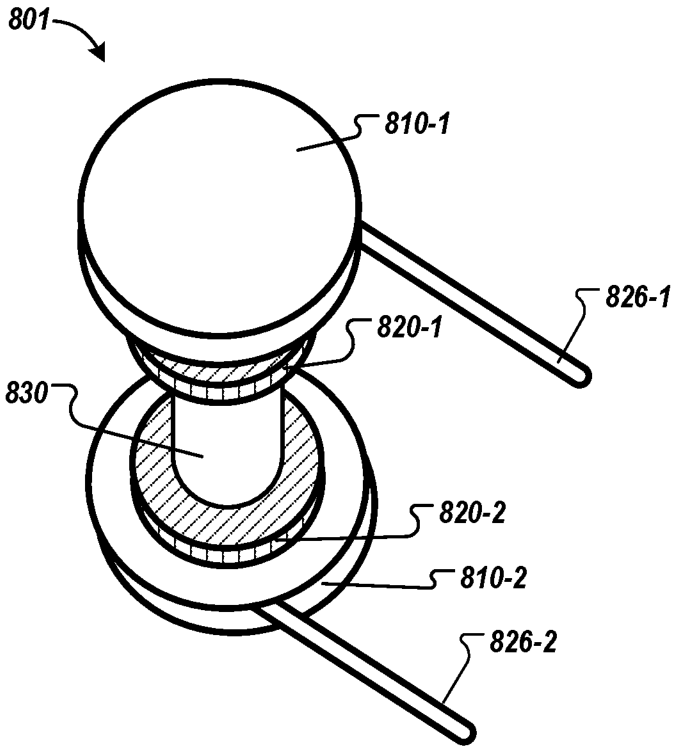
FIGS. 8A and 8B show an example fuel cell having a disc form.
Figure 8B:
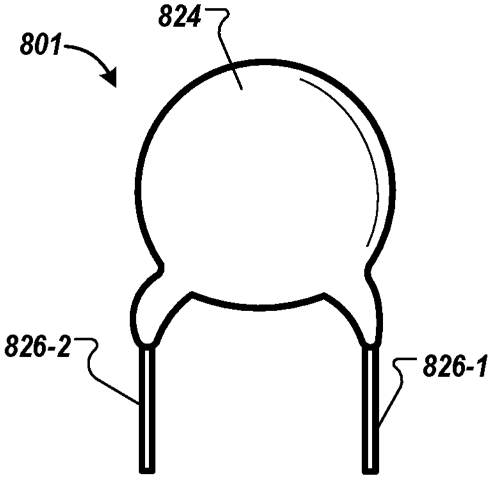

FIGS. 8A and 8B show an example fuel cell 801 having a disc form. FIG. 8A is an exploded view of the example fuel cell 801. The fuel cell 801 includes disc-shaped electrodes 810-1, 810-2. Electrode 810-1 is connected to wire 826-1. Electrode 810-2 is connected to wire 826-2. The fuel cell 801 includes disc-shaped ion media layers 820-1, 820-2. In some examples, the electrodes 810-1, 810-2 have larger diameters than the ion media layers 820-1, 820-2.

The fuel cell 801 includes radioactive source 830. The source can have a flat, round disc shape. The ion media layers 820-1 can have rounded shapes with larger diameters compared to the diameter of the source 830. In some examples, the source 830 can be grounded to one of the electrodes. In some examples, the source 830 can be embedded in the ion media or printed on a gold or silver electrode.

Referring to FIG. 8B, the fuel cell 801 can be encapsulated in a shielding 824, e.g., a ceramic shielding. Apertures in the shielding 824 can permit passage of the wires 826-1, 826-2. In some examples, the fuel cell 801 is coated with a non-conductive ceramic shielding material that also provides structural integrity. The disc shaped fuel cell 801 of FIGS. 8A and 8B can be used in implementations such as into a motherboard electronic starting and control circuit.

Figure 9:
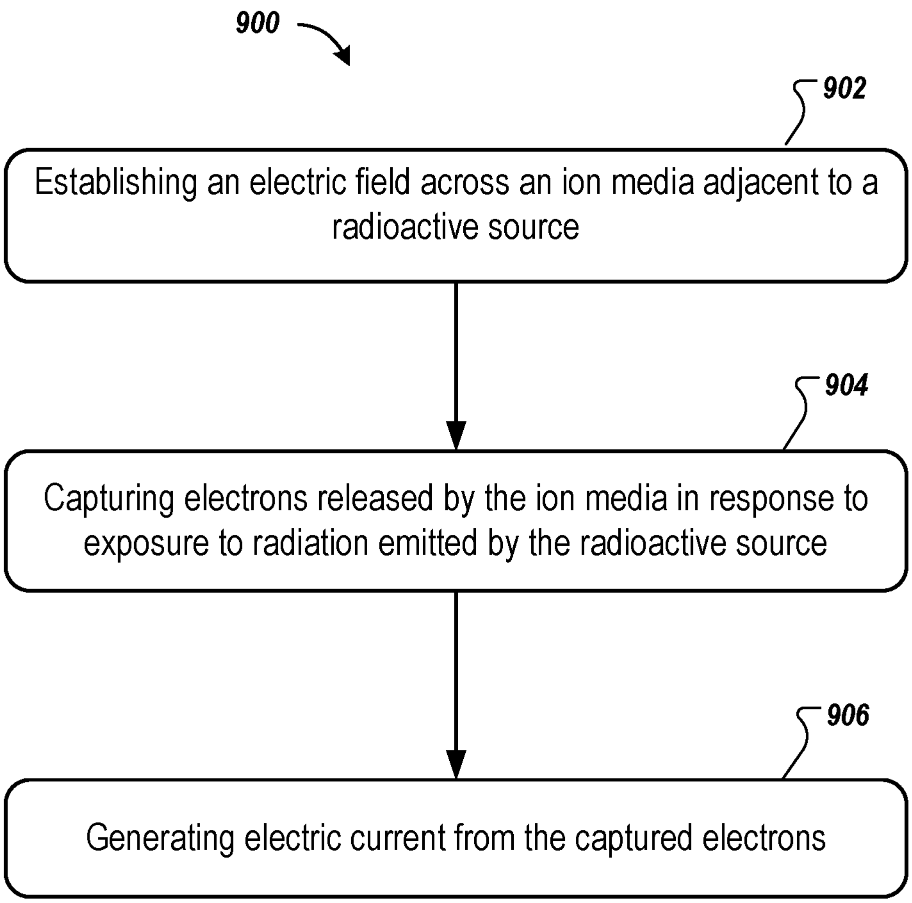
FIG. 9 shows a flow chart of an example process of using the fuel cell to generate electrical current.

FIG. 9 shows a flow chart of an example process 900 of using the fuel cell to generate electrical current. The process 900 includes establishing an electric field across an ion media adjacent to a radioactive source (902). For example, the supplemental power supply 140 connects to electrodes 110 of the fuel cell 101. The supplemental power supply 140 energizes the electrodes 110, establishing the electric field 114 between the electrodes 110.

The process 900 includes capturing electrons released by the ion media in response to exposure to radiation emitted by the radioactive source (904). For example, the ion media layers 120 release electrons in response to exposure to radiation emitted by the radioactive source 130. The electrodes 110 capture electrons released by the ion media layers 120.

The process 900 includes generating electric current from the captured electrons (906). For example, the electrodes 110 generate electric current from the captured electrons. The generated electric current sustains the electric field 114. In some examples, the generated electric current recharges the supplemental power supply 140. In some examples, the generated electric current powers an electric load.

The order of steps in the process 900 described above is illustrative only, and can be performed in different orders. In some implementations, the process 900 can include additional steps, fewer steps, or some of the steps can be divided into multiple steps.

Figure 10:
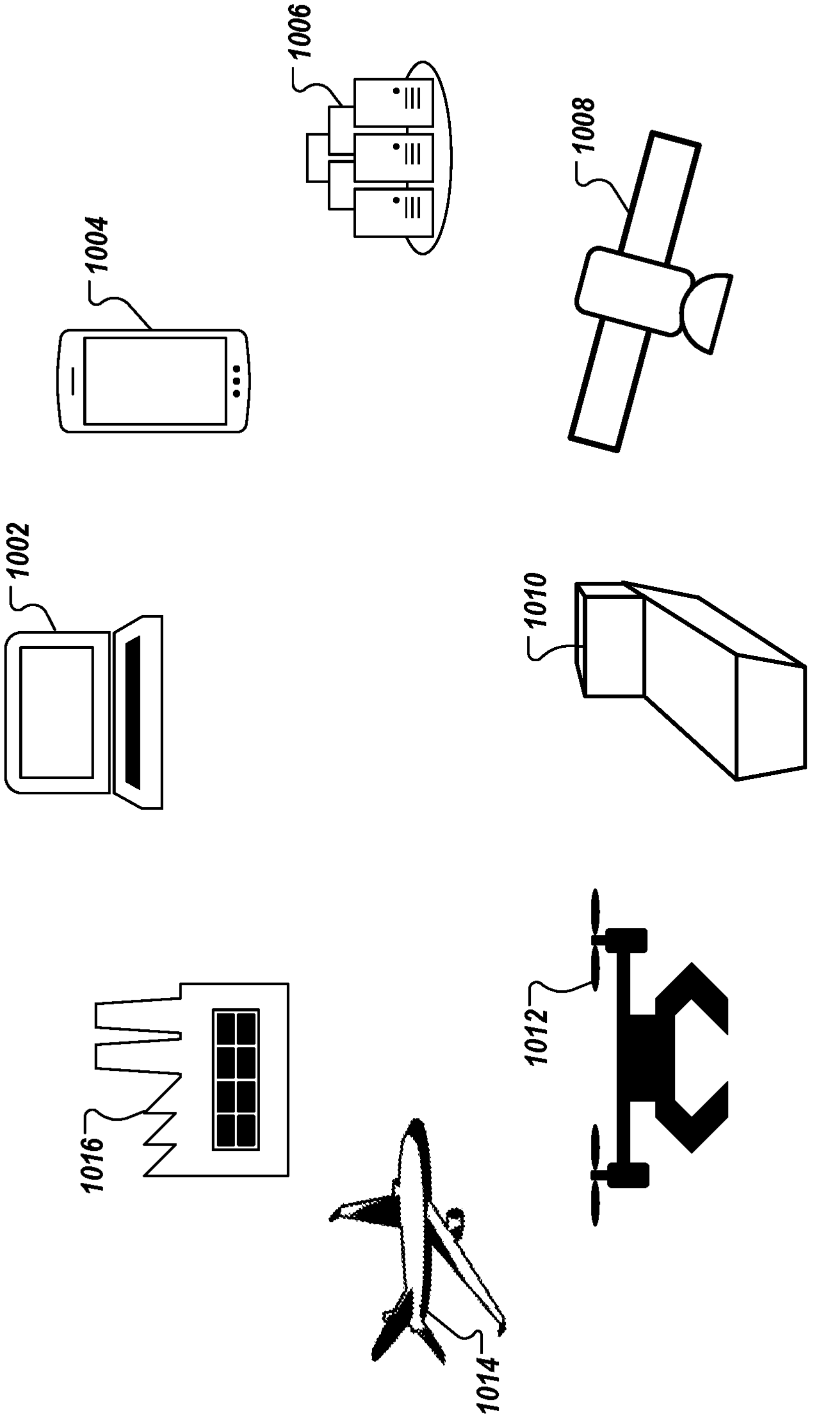
FIG. 10 shows example systems that can be implemented with the disclosed systems and methods.

FIG. 10 depicts example systems that can be implemented with the disclosed systems and methods. The systems can receive power from the disclosed fuel cells. In some examples, the disclosed fuel cells can amplify electrical current generated by the example systems. In some examples, the disclosed fuel calls can amplify electrical current provided to the example systems.

The example systems can include, e.g., computers 1002, electronic devices 1004, data centers 1006, satellites 1008, marine vessels 1010. In some examples, the systems can include manned or unmanned vehicles. The systems can include drones 1012, e.g., aerial, ground, or underwater drones. In some examples, the systems can include an aircraft or space craft 1014. In some examples, the systems can include a power generation system 1016. For example, the power generation system 1016 can generate electrical current, and the disclosed fuel cells can amplify the electrical current.

In some examples, multiple fuel cells can be combined into a power generation package for providing power to a load. In some examples, multiple fuel cells can be electrically connected to each other in series or in parallel.

The disclosed fuel cells can be used to power electronic devices such as cellular phones. A thin fuel cell can be installed in a housing of an electronic device to supply power to the device beyond the device's expected life span. The fuel cell power can be recovered from older devices and installed in newer devices for continuous use until reaching the half-life of the isotope used for the radioactive source.

The disclosed fuel cells can be installed into a motherboard of a laptop or desktop computer to supply power to the computer beyond the expected life span of the computer. The fuel cell can be recovered from older computers and installed in newer computers for continuous use until reaching the half-life of the isotope used for the radioactive source.

The disclosed fuel cells can be used as data center power supplies. As the use of data management and cloud computing grows, the disclosed fuel cells can be installed in data centers to supply the energy to the processors and to the environmental control systems the data centers are housed in.

The disclosed fuel cells can be used for multifunctional multi-industry remote sensor power. The disclosed fuel cells can be installed into the motherboard of a remote sensor array to supply power to the sensors. The fuel cells can be installed, for example, on satellite or aerial sensors. The sensors can be used, e.g., for military application, oil and gas applications, and space applications. The fuel cells can provide power for continuous use until reaching the half-life of the isotope used for the radioactive source.

The disclosed fuel cells can be used for battery amplification. For example, the fuel cell can be installed in a flow-through path coupled with battery power supplies in order to provide power amplification. The power amplifier can be used continuously and can extend the life span of the battery.

The disclosed fuel cells can be used to amplify power generated by solar panel arrays. For example, the fuel cell can be installed in a flow-through path coupled with solar power cells in order to provide power amplification. The power amplifier can be used continuously and can extend the life span of the solar array.

The disclosed fuel cells can be used to amplify power generated by electrical generators. The electrical generators can be, for example, small generators used for local, temporary, and/or emergency power uses. For example, the fuel cell can be installed in a flow-through path coupled with a generator in order to provide power amplification. The power amplifier can be used continuously and can extend the life span of the generator.

The disclosed fuel cells can be used to power manned and unmanned vehicles for use on land, in space, in the air, on water, or underwater. For example, the fuel cells can power drones, submarines, and aircraft. The fuel cell can be installed into the power source of a vehicle supply power to provide power to the watercraft, aircraft, space craft, terrestrial vehicle, or other vehicle.

The disclosed fuel cells can be used to power commercial shipping and aircraft. For example, an array of fuel cells can be used for the power source of a watercraft, submarine, or aircraft. The fuel cell-powered craft can be used in military and commercial shipping applications. The fuel cell can provide continuous power until reaching the half-life of the isotope used for the radioactive source or exhaustion of the ion media.

The disclosed fuel cells can be used in commercial power applications. For example, an array of fuel cells can be used for the production of commercial power. The fuel cell array can supply power to communities in a distributed power format. Thus, the fuel cells can be used for military, manufacturing, mining, and commercial power industries. The fuel cells can provide continuous power until reaching the half-life of the isotope used for the radioactive source or exhaustion of the ion media.

In one configuration, the ion media layers include a non-conductive liquids situated with an intake and/or drain. For example, the current generation and amplification capability of some materials may degrade over time such that performance of the device is inhibited. An ion media layer with an intake and a drain may be coupled to a reserve chamber that allows the ion media to be circulated (or recirculated) and preserve a higher performance metric for an increased period of time. The ability to circulate ion media also may be configured to support gaseous ion media. In still other configurations, the ion media may be a gelatinous compound tied to a circulation (or recirculation) pump. Expended media may be routed to a spent media chamber for disposal in accordance with an accredited maintenance program.

The ion media layer also may be configured to reside in sheets and packaging such that the layers are configured to reside in close proximity to the radioactive source. The packaging and ion media layer may include embedded electrodes that receive and route the current to a load. For example, the packaging may include a grid of electrodes with liquid or solid ion media embedded around the electrodes. The packaging may include a cartridge so that the ion media layer is aligned to maintain a specified proximity and orientation relative to the radioactive source.

Although the ion media layer was described as replaceable for maintenance purposes, the same configurations described above also may be used to support the radioactive source. For example, different radioactive sources have different half-lives. A power control circuit may either be programmed to support a given material's known half life so that performance is maintained at a designated level over a specified duration. Alternatively, the system may measure system performance so that the system compensates for change performance levels and maintains a consistent power profile. The power control circuit may regulate, add new ion media and/or radioactive source material (and remove older material) in order to maintain a designated profile. The power control circuit also may modify the I-V power characteristics to operate in a desired range.

In one configuration, the packaging includes a control circuit that regulates power settings that accounts for changing behavior over time. Constituent power control circuits on each of the packaging modules may communicate with one another in order to allow the system to maintain power at a designated level. The constituent power control circuits may provide measurement data to a system control to manage the underlying power consumption. The system may generate an alarm when one or more cartridges is no longer performing at a threshold level of performance. Alternatively or in addition, the system may poll an administrator to circulate or replace ion media and/or radioactive sources.

A number of implementations have been described. Nevertheless, it will be understood that various modifications may be made without departing from the spirit and scope of the disclosure. For example, various forms of the flows shown above may be used, with steps re-ordered, added, or removed. While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A device comprising:
- a radioactive source that emits charged particle radiation;
- ion-producing media positioned adjacent to the radioactive source, wherein the ion-producing media comprises a material that includes carbon and releases ions in response to exposure to the charged particle radiation; and
- a set of two or more electrodes configured to:
  - capture ions released by the ion-producing media in response to exposure to the charged particle radiation emitted by the radioactive source; and
  - generate electric current from the captured ions.

2. The device of claim 1, wherein the charged particle radiation comprises alpha radiation.

3. The device of claim 1, wherein the charged particle radiation comprises beta radiation.

4. The device of claim 1, wherein:
- the radioactive source further emits neutral particle radiation; and
- the ion-producing media further releases ions in response to exposure to the neutral particle radiation.

5. The device of claim 1, wherein:
- the two or more electrodes are configured to establish an electrostatic field across the ion-producing media; and
- the ion-producing media releases the ions by undergoing ionization from a non-ionized form in response to exposure to the charged particle radiation in the presence of the electrostatic field.

6. The device of claim 1, wherein:
- the set of two or more electrodes comprises:
  - a first electrode comprising a first plate extending in a first plane; and
  - a second electrode comprising a second plate extending in a second plane that is parallel to the first plane; and
- the ion-producing media comprises:
  - a first ion-producing media layer positioned between the radioactive source and the first plate; and
  - a second ion-producing media layer positioned between the radioactive source and the second plate.

7. The device of claim 1, wherein the ion-producing media includes at least one of low density polyethylene, high density polyethylene, petroleum jelly, butane, petroleum oil, helium gas, industrial diamond including carbon, or industrial diamond including boron.

8. The device of claim 1, wherein the ion-producing media includes an electrically non-conductive gas, an electrically non-conductive solid, or an electrically non-conductive liquid.

9. The device of claim 1, wherein:
- the set of two or more electrodes form a first hollow sphere that encloses the ion-producing media; and
- the ion-producing media forms a second hollow sphere that encloses the radioactive source, the first hollow sphere being concentric with the second hollow sphere.

10. The device of claim 1, wherein:
- at least one electrode of the set of two or more electrodes forms a first hollow cylinder that encloses the ion-producing media; and
- the ion-producing media forms a second hollow cylinder that encloses the radioactive source, the first hollow cylinder being coaxial with the second hollow cylinder.

11. A system comprising:

an electrical load; and a power supply for powering the electrical load, the power supply comprising:

a radioactive source that emits charged particle radiation;

ion-producing media positioned adjacent to the radioactive source, wherein the ion-producing media comprises a material that includes carbon and releases ions in response to exposure to the charged particle radiation; and a set of two or more electrodes configured to:

capture ions released by the ion-producing media in response to exposure to the charged particle radiation emitted by the radioactive source; and generate electric current from the captured ions.

12. The system of claim 11, wherein the charged particle radiation comprises alpha radiation.

13. The system of claim 11, wherein the charged particle radiation comprises beta radiation.

14. The system of claim 11, wherein:

the radioactive source further emits neutral particle radiation; and the ion-producing media further releases ions in response to exposure to the neutral particle radiation.

15. The system of claim 11, wherein:

the two or more electrodes are configured to establish an electrostatic field across the ion-producing media; and the ion-producing media releases the ions by undergoing ionization from a non-ionized form in response to exposure to the charged particle radiation in the presence of the electrostatic field.

16. A method of generating electric current, the method comprising:

establishing, by a set of two or more electrodes, an electrostatic field across ion-producing media positioned adjacent to a radioactive source, wherein:

the radioactive source emits charged particle radiation; and the ion-producing media comprises a material that includes carbon and releases ions by undergoing ionization from a non-ionized form in response to exposure to the charged particle radiation in the presence of the electrostatic field;

capturing, by the set of two or more electrodes, ions released through ionization of the ion-producing media in response to exposure to the charged particle radiation emitted by the radioactive source; and generating, by the set of two or more electrodes, the electric current from the captured ions.

17. The method of claim 16, wherein the charged particle radiation comprises alpha radiation.

18. The method of claim 16, wherein the charged particle radiation comprises beta radiation.

19. The method of claim 16, wherein:

the radioactive source further emits neutral particle radiation; and the ion-producing media further releases ions in response to exposure to the neutral particle radiation.

* * * * *